United States Patent
Lee et al.

(10) Patent No.: US 10,431,240 B2
(45) Date of Patent: *Oct. 1, 2019

(54) SPEECH ENHANCEMENT METHOD AND SYSTEM

(71) Applicants: Samsung Electronics Co., Ltd., Gyeonggi-do (KR); Industry-University Cooperation Foundation Hanyang University, Seoul (KR)

(72) Inventors: Seung-yeol Lee, Seoul (KR); Joon-hyuk Chang, Seoul (KR); Byeong-seob Ko, Gyeonggi-do (KR); Song-kyu Park, Gyeonggi-do (KR); Tae-jun Park, Seoul (KR)

(73) Assignees: Samsung Electronics Co., Ltd (KR); Industry-University Cooperation Foundation Hanyang University (KR)

( * ) Notice: Subject to any disclaimer, the term of this patent is extended or adjusted under 35 U.S.C. 154(b) by 53 days.

This patent is subject to a terminal disclaimer.

(21) Appl. No.: 15/545,198

(22) PCT Filed: Sep. 23, 2015

(86) PCT No.: PCT/KR2015/010016
§ 371 (c)(1),
(2) Date: Jul. 20, 2017

(87) PCT Pub. No.: WO2016/117793
PCT Pub. Date: Jul. 28, 2016

(65) Prior Publication Data
US 2017/0365275 A1    Dec. 21, 2017

Related U.S. Application Data (60) Provisional application No. 62/106,959, filed on Jan. 23, 2015.

(51) Int. Cl.
*G10L 21/02* (2013.01)
*G10L 21/0364* (2013.01)
(Continued)

(52) U.S. Cl.
CPC ........ G10L 21/0364 (2013.01); G10L 15/063 (2013.01); G10L 15/30 (2013.01);
(Continued)

(58) Field of Classification Search
USPC ......... 704/201, 207–209, 214, 226–228, 233
See application file for complete search history.

(56) References Cited

U.S. PATENT DOCUMENTS

| 4,630,305 A | 12/1986 | Borth et al. |
| 7,702,504 B2 | 4/2010 | Son et al. |

(Continued)

FOREIGN PATENT DOCUMENTS

| KR | 10-0668300 | 1/2007 |
| KR | 1020080105334 | 12/2008 |

(Continued)

OTHER PUBLICATIONS

Written Opinion dated Jan. 7, 2016 issued in counterpart application No. PCT/KR2015/010016, 16 pages.

*Primary Examiner* — Leonard Saint Cyr
(74) *Attorney, Agent, or Firm* — The Farrell Law Firm, P.C.

(57) ABSTRACT

Provided is a speech enhancement method and a system therefor. The speech enhancement method includes receiving at least one speech signal; generating a first speech signal by performing a primary speech enhancement on the at least one speech signal; selecting a noise removing gain corresponding to the first speech signal from pre-learned noise removing gain information; and generating a second speech signal by performing a secondary speech enhancement on
(Continued)

the first speech signal based on the selected noise removing gain.

13 Claims, 6 Drawing Sheets

(51) Int. Cl.
| | | |
|---|---|---|
| *G10L 15/06* | (2013.01) | |
| *G10L 15/30* | (2013.01) | |
| *G10L 21/0232* | (2013.01) | |
| *G10L 25/84* | (2013.01) | |
| *G10L 21/0208* | (2013.01) | |

(52) U.S. Cl.
CPC ...... *G10L 21/0205* (2013.01); *G10L 21/0208* (2013.01); *G10L 21/0232* (2013.01); *G10L 25/84* (2013.01)

(56) References Cited

U.S. PATENT DOCUMENTS

| | | | | |
|---|---|---|---|---|
| 8,326,616 | B2* | 12/2012 | Li | G10L 21/0208 704/226 |
| 8,831,936 | B2* | 9/2014 | Toman | G10L 21/0272 704/228 |
| 2002/0002455 | A1* | 1/2002 | Accardi | G10L 21/0208 704/226 |
| 2005/0055219 | A1* | 3/2005 | Accardi | G10L 19/24 704/278 |
| 2009/0299742 | A1* | 12/2009 | Toman | G10L 21/0208 704/233 |
| 2013/0246059 | A1* | 9/2013 | Kechichian | G10L 21/0208 704/226 |
| 2014/0119548 | A1* | 5/2014 | Kechichian | H04R 3/005 381/56 |
| 2014/0149111 | A1* | 5/2014 | Matsuo | G10L 21/0232 704/206 |
| 2015/0071461 | A1* | 3/2015 | Thyssen | G10L 21/0208 381/94.1 |
| 2016/0111113 | A1 | 4/2016 | Cho et al. | |

FOREIGN PATENT DOCUMENTS

| | | |
|---|---|---|
| KR | 1020100136634 | 12/2010 |
| WO | WO 2014/196769 | 12/2014 |

* cited by examiner

| PRIORI SNR | POSTERIORI SNR | NOISE REMOVING GAIN |
|---|---|---|
| SNR_0 | SNR_1 | G0 |
| SNR_2 | SNR_3 | G1 |
| SNR_4 | SNR_5 | G2 |
| SNR_6 | SNR_7 | G3 |
| ... | ... | ... |

SPEECH ENHANCEMENT METHOD AND SYSTEM

PRIORITY

This application is a National Phase Entry of PCT International Application No. PCT/KR2015/010016, which was filed on Sep. 23, 2015, and claims priority to U.S. Provisional Patent Application No. 62/106,959, which was filed on Jan. 23, 2015, the contents of each of which are incorporated herein by reference.

TECHNICAL FIELD

The present invention relates to a method of performing speech enhancement via a first speech enhancing device and a second speech enhancing device included in a speech enhancing system.

BACKGROUND ART

Speech recognition technique is a technique for recognizing a speech signal input by a user or the like as a signal corresponding to a predetermined language. For example, speech recognition technology may be used for controlling an operation of a predetermined electronic device, such as voice recognizing navigation system, a mobile phone, and a TV.

In order to improve speech recognition rate, a speech enhancement technique, which is a technique for extracting a pure speech signal by removing noise mixed in an input speech signal, may be used. Examples of techniques related to speech enhancement may include beam-forming that focuses a speech from a particular direction and removes ambient noise and noise suppression that removes static noise.

DETAILED DESCRIPTION OF THE INVENTION

Technical Problem

Provided are a method of performing speech enhancement via a first speech enhancing device and a second speech enhancing device included in a speech enhancing system.

Technical Solution

According to an aspect of the present invention, a speech enhancement method includes receiving at least one speech signal; generating a first speech signal by performing a primary speech enhancement on the at least one speech signal; selecting a noise removing gain corresponding to the first speech signal from pre-learned noise removing gain information; and generating a second speech signal by performing a secondary speech enhancement on the first speech signal based on the selected noise removing gain.

Furthermore, the generating of the first speech signal may include calculating a speech-presence probability regarding the at least one speech signal based on the at least one speech signal; calculating a gain function based on the speech-presence probability; and generating the first speech signal by performing a primary speech enhancement for applying the gain function on the at least one speech signal.

Furthermore, the calculating of the speech-presence probability may include calculating the speech-presence probability based on an estimate value of a frame-specific speech-absence probability, an estimated value of a speech-absence probability regarding an entire frequency band, and an estimated value of a speech-absence probability regarding a current frame.

Furthermore, the primary speech enhancement may be a spatial filtering based on a matrix associated with the at least one speech signal.

Furthermore, the selecting of the noise removing gain may include obtaining the noise removing gain information and the first speech signal; calculating a priori signal-to-noise ratio (SNR) and a posteriori SNR regarding the first speech signal; and selecting the noise removing gain from the noise removing gain information based on the calculated priori SNR and the calculated posteriori SNR.

Furthermore, the noise removing gain information may include noise removing gains corresponding to priori SNR and posteriori SNR of each of speech signals on which a primary speech enhancement is performed.

Furthermore, the noise removing gain information may be information trained through machine learning.

According to another aspect of the present invention, a speech enhancing system includes a first speech enhancing device, which receives at least one speech signal and generates a first speech signal by performing a primary speech enhancement on the at least one speech signal; and a second speech enhancing device, which selects a noise removing gain corresponding to the first speech signal from pre-learned noise removing gain information and generates a second speech signal by performing a secondary speech enhancement on the first speech signal based on the selected noise removing gain.

Furthermore, the first speech enhancing device may be a terminal device, and the second speech enhancing device may be a server.

According to another aspect of the present invention, there is provided a non-transitory computer-readable recording medium having recorded thereon a computer program for implementing a speech enhancement method.

Advantageous Effect of the Invention

According to the embodiments, different types of speech enhancements may be performed by a first speech enhancing device and a second speech enhancing device in a speech enhancement system, and thus speech enhancement may be performed more effectively.

BEST MODE

Hereinafter, embodiments of the present invention will be described in detail with reference to the accompanying drawings. The following examples are intended to illustrate the invention and are not intended to limit or limit the scope of the invention. It will be understood by those of ordinary skill in the art that various changes in form and details may be made therein without departing from the spirit and scope of the invention as defined by the appended claims.

With respect to the terms in the various embodiments of the present disclosure, the general terms which are currently and widely used are selected in consideration of functions of structural elements in the various embodiments of the present disclosure. However, meanings of the terms may be changed according to intention, a judicial precedent, appearance of a new technology, and the like.

In addition, unless explicitly described to the contrary, the word "comprise" and variations such as "comprises" or "comprising" will be understood to imply the inclusion of stated elements but not the exclusion of any other elements. In addition, the term "units" described in the specification mean units for processing at least one function and operation and can be implemented by software components or hardware components, such as FPGA or ASIC. However, the "units" are not limited to software components or hardware components. The "units" may be embodied on a recording medium and may be configured to operate one or more processors. Therefore, for example, the "units" may include components, such as software components, object-oriented software components, class components, and task components, processes, functions, properties, procedures, subroutines, program code segments, drivers, firmware, micro code, circuits, data, databases, data structures, tables, arrays, and variables. Components and functions provided in the "units" may be combined to smaller numbers of components and "units" or may be further divided into larger numbers of components and "units."

Throughout the specification, it will be understood that when a portion is referred to as being "connected to" another portion, it can be "directly connected to" the other portion or "electrically connected to" the other portion via another element. Furthermore, it will be further understood that the terms "comprises" and/or "comprising" used herein specify the presence of stated features or components, but do not preclude the presence or addition of one or more other features or components.

Hereinafter, exemplary embodiments will be described in detail with reference to accompanying drawings.

Figure 1:
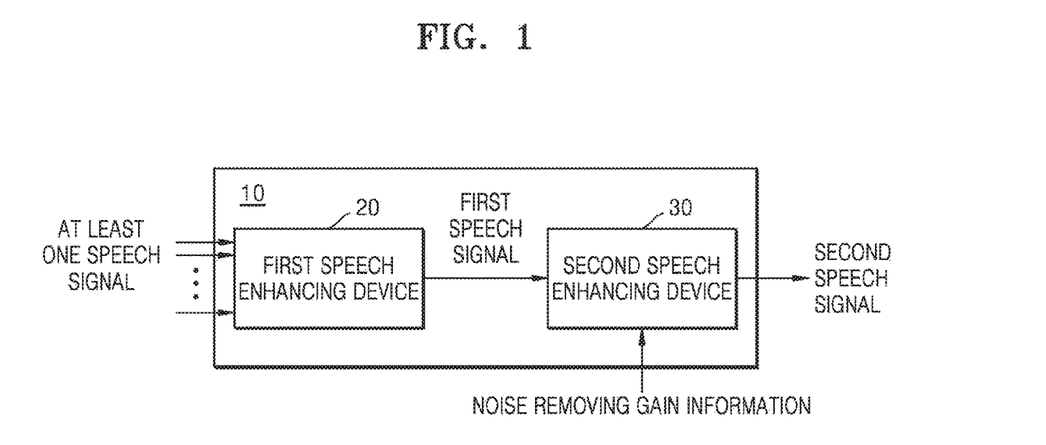
FIG. 1 is a diagram showing a speech enhancing system, according to an embodiment.

FIG. 1 is a diagram showing a speech enhancing system 10, according to an embodiment.

The speech enhancing system 10 may include a first speech enhancing device 20 and a second speech enhancing device 30, according to an embodiment. The speech enhancing system 10 shown in FIG. 1 shows only the components associated with the present embodiment. Therefore, one of ordinary skill in the art will understand that general-purpose components other than the components shown in FIG. 1 may be further included.

The first speech enhancing device 20 may receive at least one speech signal, according to an embodiment. The first speech enhancing device 20 may receive at least one speech signal through at least one microphone, according to an embodiment.

The first speech enhancing device 20 may generate a first speech signal by performing a primary speech enhancement on at least one speech signal, according to an embodiment. According to an embodiment, the first speech enhancing device 20 may perform spatial filtering on at least one speech signal as a primary speech enhancement. Spatial filtering refers to amplification of a speech signal in a particular direction by attenuating speech signals in directions other than the particular direction in a case where a speech signal of a user is generated in the particular direction.

The first speech enhancing device 20 may perform spatial filtering on at least one speech signal, based on a matrix associated with at least one speech signal, according to an embodiment. In other words, the first speech enhancing device 20 may perform a primary speech enhancement on at least one speech signal based on a matrix associated with at least one speech signal without performing a separate operation for detecting a direction. Detailed description thereof will be given below with reference to FIG. 2.

The first speech enhancing device 20 may transmit a first speech signal, which is generated as a result of performing a primary speech enhancement, to the second speech enhancing device 30, according to an embodiment. According to an embodiment, the first speech enhancing device 20 may transmit the first speech signal to the second speech enhancing device 30 via a communication network. Examples of the communication network may include wired/wireless communication networks, e.g., the Internet, a LAN network, a WAN network, a telephony network, a wireless data communication network, such as LTE, infrared ray communication, etc.

The second speech enhancing device 30 may select a noise removing gain corresponding to the first speech signal from pre-learned noise removing gain information according to an embodiment.

First, the second speech enhancing device 30 may obtain pre-learned noise removing gain information.

According to an embodiment, the second speech enhancing device 30 may obtain a noise removing gain table as the pre-learned noise removing gain information. The noise removing gain table may include a priori signal to noise ratio (SNR) and a posteriori signal-to-noise ratio (SNR) regarding a speech signal on which a primary speech enhancement is performed and may include a noise removing gain for minimizing noise in the speech signal with the priori SNR and the posteriori SNR. For example, the noise removing gain table may include the priori SNR SNR_0 and the posteriori SNR SNR_1 of a speech signal Sig_0 that is a speech signal on which a primary speech enhancement is performed and a noise removing gain G0 corresponding to the posteriori SNR SNR_1. According to an embodiment, noise removing gain information may be information trained through machine learning.

According to another embodiment, the second speech enhancing device 30 may obtain a clean speech signal A and a speech signal R, which is obtained by performing a primary speech enhancement on the clean speech signal A with noise, as noise removing gain information. The clean speech signal A may be a pure speech signal of a user without noise. Next, the second speech enhancing device 30 may calculate a predetermined gain G for a speech signal A', which is obtained by applying the predetermined gain G to the speech signal R, to have a minimum mean square error with the clean speech signal A. Furthermore, the second speech enhancing device 30 may calculate a noise removing gain for minimizing the noise in the speech signal R using a data-driven optimization method known in the art, based on the priori SNRs and the posteriori SNRs of the clean speech signal A and the speech signal R. Therefore, the second speech enhancing device 30 may store noise removing gains corresponding to the priori SNR and the posteriori SNR of the speech signal R as a noise removing gain table.

According to an embodiment, the second speech enhancing device 30 may obtain a first speech signal from the first speech enhancing device 20. The second speech enhancing device 30 may calculate a priori SNR and a posteriori SNR for the first speech signal. Next, the second speech enhancing device 30 may select a noise removing gain corresponding to the first speech signal from previously obtained noise removing gain information based on the priori SNR and the posteriori SNR regarding the first speech signal. In other words, the second speech enhancing device 30 may select a noise removing gain corresponding to the priori SNR and the posteriori SNR regarding the first speech signal from the obtained noise removing gain information. Detailed description thereof will be given below with reference to FIG. 3.

Therefore, the second speech enhancing device 30 may generate a second speech signal by performing a secondary speech enhancement for applying the selected noise removing gain to the first speech signal.

The first speech enhancing device 20 may be a terminal device, according to an embodiment. For example, the first speech enhancing device 20 may be a portable device, such as telephone, a personal digital assistant (PDA), a smart phone, a tablet PC, an e-book reader, a wrist watch (smart watch), eyeglasses (smart glasses), a car navigation system, a car audio system, a car video system, an integrated car media system, a telematics system, and a laptop computer. Furthermore, the second speech enhancing device 30 may be a server connected to a terminal device according to an embodiment. Furthermore, since the primary speech enhancement performed by the primary speech enhancement device 20 may be a multi-microphone based terminal-oriented noise removing technique, the first speech enhancing device 20 may improve a speech recognition rate against spatial changes. Furthermore, since the secondary speech enhancement performed by the second speech enhancing device 30 may be a single microphone-based server-oriented noise removing technique, a speech recognition rate against changes of environmental noise around the first speech enhancing device 20. Furthermore, since the first speech enhancing device 20 may be a terminal device and the second speech enhancing device 30 may be a server, the secondary speech enhancement associated with a larger amount of calculations than the primary speech enhancement may be performed by the server.

Figure 2:
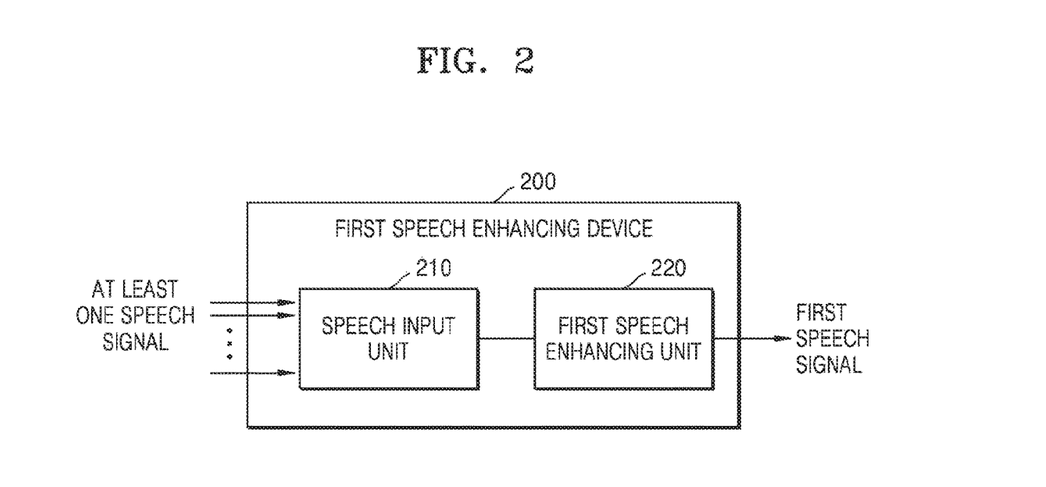
FIG. 2 is a diagram showing a first speech enhancing device, according to an embodiment.

FIG. 2 is a diagram showing a first speech enhancing device 200, according to an embodiment.

The first speech enhancing device 200 may include a speech input unit 210 and a first speech enhancing unit 220, according to an embodiment. The first speech enhancing device 200 shown in FIG. 2 shows only the components associated with the present embodiment. Therefore, one of ordinary skill in the art will understand that general-purpose components other than the components shown in FIG. 2 may be further included. Furthermore, the first speech enhancing device 200 of FIG. 2 may be an embodiment of the first speech enhancing device 20 of FIG. 1.

The speech input unit 210 may include at least one microphone, according to an embodiment. Furthermore, the speech input unit 210 may receive a user's speech signal through the at least one microphone. Therefore, the speech input unit 210 may receive at least one speech signal. For example, two microphones, which constitute the speech input unit 210, may be located at the top and the bottom of the first speech enhancing device 200, respectively. Therefore, the first speech enhancing device 200 may receive speech signals via the two microphones, respectively.

The first speech enhancing unit 220 may perform a primary speech enhancement on at least one speech signal, thereby generating a first speech signal, according to an embodiment. More specifically, the first speech enhancing unit 220 may perform a primary speech enhancement on at least one speech signal based on a matrix associated with at least one speech signal.

According to an embodiment, the first speech enhancing unit 220 may calculate a speech-presence probability regarding at least one speech signal based on the at least one speech signal. For example, the first speech enhancing unit 220 may use Equation 1 through Equation 11 below to calculate the speech-presence probability.

First, when the at least one speech signal includes n speech signals, the first speech enhancing unit 220 may perform a Fast Fourier Transform (FFT) on n speech signals $[y_1(t), y_2(t), \ldots, y_n(t)]$ in the time domain, thereby obtaining n speech signals $[Y_1(k,l), Y_2(k,l) \ldots Y_n(k,l)]$ in the frequency domain. Here, k denotes a frequency index and l denotes a frame index.

Next, the first speech enhancing unit 220 may calculate $\psi(k,l)$ and $\tilde{\psi}(k,l)$, which are posteriori SNRs regarding at least one speech signal, according to Equation 1 below.

$$\psi(k,l) = y^H(k,l)\hat{\Phi}_{vv}^{-1}(k,l)y(k,l)$$

$$\tilde{\psi}(k,l) = tr[\hat{\Phi}_{vv}^{-1}(k,l)\Phi_{yy}(k,l)] \qquad \text{[Equation 1]}$$

In Equation 1, a vector y(k,l) regarding at least one speech signal denotes $[Y_1(k,l) \ldots Y_N(k,l)]^T$, and a power spectrum density $\Phi_{yy}(k,l)$ regarding the at least one speech signal denotes a matrix like $E\{y(k,l)y^H(k,l)\}$. $\Phi_{vv}(k,l)$ denotes a power spectrum density regarding at least one noise signal $v(k,l) \equiv [V_1(k,l) \ldots V_N(k,l)]^T$ corresponding to the at least one speech signal and denotes a matrix like $E\{v(k,l)v^H(k,l)\}$. $\hat{\Phi}_{vv}(k,l)$ denotes an estimated value regarding $\Phi_{vv}(k,l)$.

Next, the first speech enhancing unit 220 may calculate an estimated value $\hat{q}_{local}(k,l)$ of a frequency-specific speech-absence probability based on the posteriori SNRs $\psi(k,l)$ and $\tilde{\psi}(k,l)$ according to Equation 2 below.

$$\hat{q}_{local}(k, l) = \begin{cases} 1, & \text{if } \tilde{\psi}(k, l) < N \text{ and } \psi(k, l) < \psi_0 \\ \dfrac{\tilde{\psi}_0 - \tilde{\psi}(k, l)}{\tilde{\psi}_0 - N} & \text{if } N \leq \tilde{\psi}(k, l) < \tilde{\psi}_0 \text{ and } \psi(k, l) < \psi_0 \\ 0, & \text{else} \end{cases} \qquad \text{[Equation 2]}$$

In Equation 2, $\tilde{\psi}_0$ and $\psi_0$ are pre-set constants, and N denotes the number of microphones.

Next, the first speech enhancing unit 220 may calculate an estimated value $\hat{q}_{global}(k,l)$ of a speech-absence probability regarding an entire frequency band based on the posteriori SNR $\psi(k,l)$ according to Equation 3 below.

$$\hat{q}_{global}(k, l) = \begin{cases} 0, & \text{if } \psi_{global}(k, l) > \psi_0 \\ 1, & \text{if } \psi_{global}(k, l) < \psi_0 \end{cases} \qquad \text{[Equation 3]}$$

In Equation 3, the posteriori SNR $\psi_{global}(k,l)$ of the entire frequency band may be calculated according to Equation 4 below. Furthermore, $\psi_0$ denotes a pre-set constant.

$$\psi_{global}(k,l) = \sum_{i=-K_1}^{K_1} \omega_{global}(i)\psi(k-i,l) \qquad \text{[Equation 4]}$$

In Equation 4, $K_1$ denotes a frequency index regarding the entire frequency band, and $\omega_{global}(i)$ denotes a predetermined frequency-specific weighting value.

Next, the first speech enhancing unit 220 may calculate an estimated value $\hat{q}_{frame}(l)$ of the speech-absence probability regarding a current frame, based on the posteriori SNR $\psi(k,l)$ according to Equation 5 below.

$$\hat{q}_{frame}(l) = \begin{cases} 0, & \text{if } \psi_{frame}(l) > \psi_0 \\ 1, & \text{if } \psi_{frame}(l) < \psi_0 \end{cases} \qquad \text{[Equation 5]}$$

In Equation 5, the posteriori SNR $\psi_{frame}(l)$ of the current frame may be calculated according to Equation 6 below. Furthermore, $\psi_0$ denotes a pre-set constant.

$$\psi_{frame}(l) = \frac{1}{K}\sum_{i=1}^{K} \psi(i,l) \qquad \text{[Equation 6]}$$

In Equation 6, K denotes a frequency index.

Next, the first speech enhancing unit 220 may calculate an estimated value of a final speech-absence probability according to Equation 7 by using $\hat{q}_{local}(k,l)$, $\hat{q}_{global}(k,l)$, and $\hat{q}_{frame}(l)$ calculated according to Equations 2 through 6.

$$\hat{q}(k,l)=\hat{q}_{local}(k,l)\hat{q}_{global}(k,l)\hat{q}_{frame}(l) \qquad \text{[Equation 7]}$$

Next, the first speech enhancing unit 220 may calculate speech-presence probability p(k,l) according to Equation 8 by using the estimated value $\hat{q}(k,l)$ of the speech-absence probability.

$$p(k,l) = \left\{1 + \frac{\hat{q}(k,l)}{1-\hat{q}(k,l)}[1+\hat{\xi}(k,l)]\exp\left[-\frac{\hat{\beta}(k,l)}{1+\hat{\xi}(k,l)}\right]\right\}^{-1} \qquad \text{[Equation 8]}$$

In Equation 8 above, $\hat{\xi}(k,l)$ may be calculated according to Equation 9 below, and $\hat{\beta}(k,l)$ may be calculated according to Equation 10 below.

$$\hat{\xi}(k,l)=tr[\hat{\Phi}_{vv}^{-1}(k,l)\hat{\Phi}_{xx}(k,l)] \qquad \text{[Equation 9]}$$

$$\hat{\beta}(k,l)=y^H(k,l)\hat{\Phi}_{vv}^{-1}(k,l)\hat{\Phi}_{xx}(k,l)\hat{\Phi}_{vv}^{-1}(k,l)y(k,l) \qquad \text{[Equation 10]}$$

In Equations 9 and 10, $\hat{\Phi}_{xx}(k,l)$ may be calculated according to Equation 11 below.

$$\hat{\Phi}_{xx}(k,l)=\Phi_{yy}(k)-\hat{\Phi}_{vv}(k,l) \qquad \text{[Equation 11]}$$

According to an embodiment, the first speech enhancing unit 220 may calculate a gain function for performing a primary speech enhancement on at least one speech signal, based on the calculated speech-presence probability. For example, the first speech enhancing unit 220 may use Equations 12 through 14 below to calculate the gain function.

First, the first speech enhancing unit 220 may calculate a smoothing variable $\tilde{\alpha}_v(k,l)$ according to Equation 12 by using the speech-presence probability p(k,l).

$$\tilde{\alpha}_v(k,l)=\alpha_v+(1-\alpha_v)p(k,l) \qquad \text{[Equation 12]}$$

In Equation 12, $\alpha_v$ is a pre-set constant.

Next, the first speech enhancing unit 220 may update $\hat{\Phi}_{vv}(k,l)$ according to Equation 13 by using the smoothing variable $\tilde{\alpha}(k,l)$.

$$\hat{\Phi}_{vv}(k,l)=\tilde{\alpha}_v(k,l)\hat{\Phi}_{vv}(k,l-1)+[1-\tilde{\alpha}_v(k,l)]y(k,l)y^H(k,l) \qquad \text{[Equation 13]}$$

Furthermore, according to an embodiment, $\hat{\Phi}_{vv}(k,l)$ may be repeatedly updated according to the Equations 1 through 13 by using the updated $\hat{\Phi}_{vv}(k,l)$.

Next, the first speech enhancing unit 220 may calculate the gain function $h(j\omega)$ according to Equation 14 below by using the updated $\hat{\Phi}_{vv}(k,l)$.

$$h(j\omega) = \frac{\hat{\Phi}_{vv}^{-1}(j\omega)\hat{\Phi}_{yy}(j\omega) - I_{N\times N}}{\hat{\beta} + tr[\hat{\Phi}_{vv}^{-1}(j\omega)\Phi_{yy}(j\omega)]}u_{n_0} \qquad \text{[Equation 14]}$$

In Equation 14, $I_{N\times N}$ denotes a unit matrix and $u_{n_0}$ denotes a unity vector.

Therefore, the first speech enhancing unit 220 may generate a first speech signal by performing a primary speech enhancement for applying a gain function $h(j\omega)$ to at least one speech signal.

Since the first speech enhancing unit 220 may perform a primary speech enhancement on at least one speech signal based on a matrix like a power spectrum density regarding at least one speech signal and a matrix like a power spectrum density regarding at least one noise signal, the primary speech enhancement may be performed without performing a separate operation for detecting a direction. Furthermore, the first speech enhancing unit 220 may perform speech enhancement highly resilient to spatial environmental changes and thus, is not affected by a distance between a speech signal source and a microphone, an angle, or a transfer function.

Figure 3:
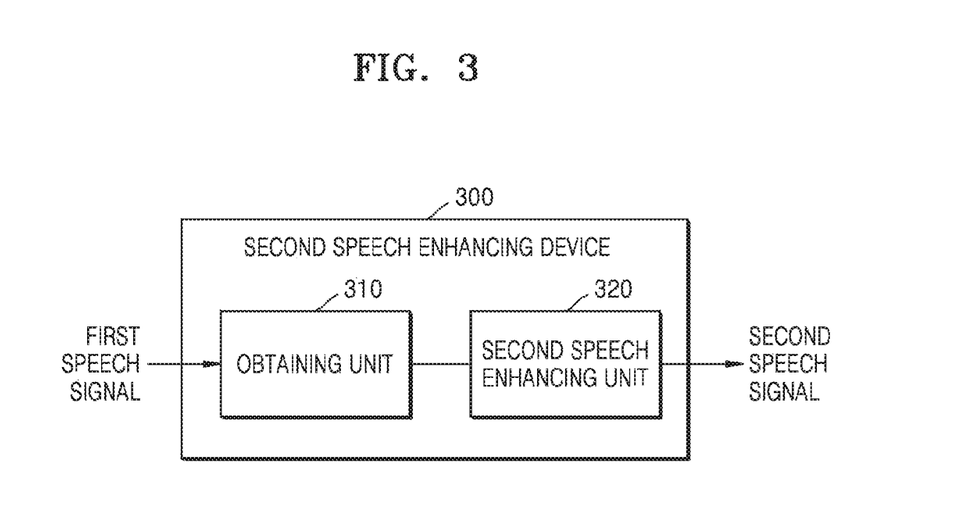
FIG. 3 is a diagram showing a second speech enhancing device, according to an embodiment.

FIG. 3 is a diagram showing a second speech enhancing device 300, according to an embodiment.

The second speech enhancing device 300 may include an obtaining unit 310 and a second speech enhancing unit 320, according to an embodiment. The second speech enhancing device 300 shown in FIG. 3 shows only the components associated with the present embodiment. Therefore, one of ordinary skill in the art will understand that general-purpose components other than the components shown in FIG. 3 may be further included.

The obtaining unit 310 may obtain pre-learned noise removing gain information according to an embodiment. According to an embodiment, the obtaining unit 310 may obtain noise removing gain information from the outside through a communication unit (not shown). Furthermore, according to another embodiment, the obtaining unit 310 may obtain noise removing gain information stored in advance from a memory (not shown). According to an embodiment, the obtaining unit 310 may obtain a noise removing gain table as the pre-learned noise removing gain information.

Figure 4:
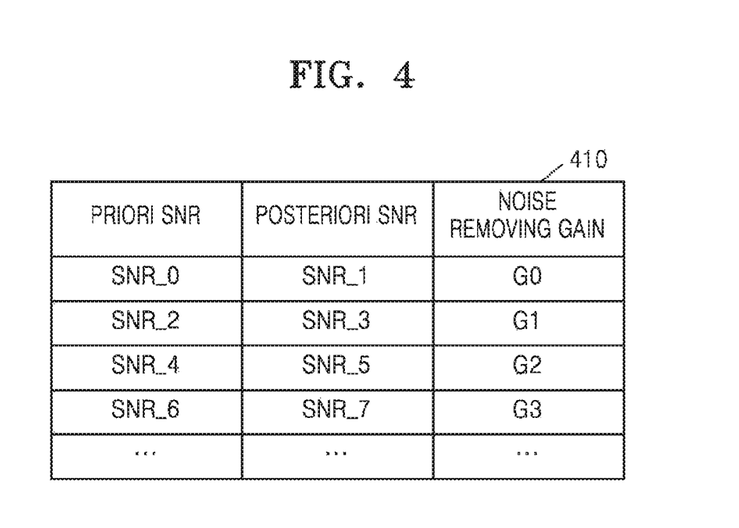
FIG. 4 is a diagram showing a noise removing gain table, according to an embodiment.

FIG. 4 is a diagram showing a noise removing gain table 410, according to an embodiment.

The obtaining unit 310 may obtain the noise removing gain table 410 including information regarding a priori SNR and a posteriori SNR regarding a speech signal on which a primary speech enhancement is performed and information regarding a noise removing gain for minimizing noise of the speech signal on which the primary speech enhancement is performed. For example, the noise removing gain table 410 may include a noise removing gain G0 for minimizing noise of a speech signal having a priori SNR SNR_0 and a posteriori SNR SNR_1. Furthermore, the noise removing gain table 410 may include a noise removing gain G1 for minimizing noise of a speech signal having SNR_2 and SNR_3.

The obtaining unit 310 of FIG. 3 may obtain a first speech signal from the first speech enhancing device 20.

The second speech enhancing unit 320 may calculate a priori SNR and a posteriori SNR regarding the first speech signal. For example, the second speech enhancing unit 320 may use Equations 15 through 21 below to calculate the priori SNR and posteriori SNR regarding the first speech signal.

First, the second speech enhancing unit 320 may calculate the posteriori SNR $\zeta(k,m)$ regarding the first speech signal according to Equation 15 below.

$$\zeta(k, m) = \frac{R^2(k, m)}{\lambda_D(k, m)} \qquad \text{[Equation 15]}$$

In Equation 15, R(k,m) denotes a first speech signal in the frequency domain, and $\lambda_D(k,m)$ denotes noise power regarding the first speech signal. k denotes a frequency index and m denotes a frame index.

Next, the second speech enhancing unit 320 may calculate an average $\tilde{\zeta}(k,m)$ of neighboring frequencies according to Equation 16 based on the posteriori SNR $\zeta(k,m)$.

$$\tilde{\zeta}(k, m) = \sum_{i=-\varpi}^{\varpi} b(i)\zeta(k-i, m), \text{ with } \sum_{i=-\varpi}^{\varpi} b(i) = 1 \qquad \text{[Equation 16]}$$

Next, the second speech enhancing unit 320 may calculate I(k,m) according to Equation 17 based on $\tilde{\zeta}(k,m)$.

$$I(k, m) = \begin{cases} 1, & \text{if } \tilde{\zeta}(k, m) > T(k, m) \\ 0, & \text{else} \end{cases} \qquad \text{[Equation 17]}$$

In Equation 17, T(k,m) may be a predetermined critical value.

Next, the second speech enhancing unit 320 may calculate an estimated value $\hat{p}(k,m)$ of a speech-presence probability according to Equation 18, based on I(k,m).

$$\hat{p}(k,m) = \alpha_p \hat{p}(k,m-1) + (1-\alpha_p)I(k,m) \qquad \text{[Equation 18]}$$

In Equation 18, $\alpha_p$ is a pre-set constant.

Next, the second speech enhancing unit 320 may calculate a smoothing variable $\alpha_s(k,m)$ according to Equation 19 below based on $\hat{p}(k,m)$.

$$\alpha_s(k,m) = \alpha_d + (1-\alpha_d)\hat{p}(k,m) \qquad \text{[Equation 19]}$$

In Equation 19, $\alpha_d$ is a pre-set constant.

Next, the second speech enhancing unit 320 may update noise power $\hat{\lambda}_D(k,m)$ according to Equation 20 below based on $\alpha_s(k,m)$.

$$\hat{\lambda}_D(k,m) = \alpha_s(k,m)\hat{\lambda}_D(k,m-1) + (1-\alpha_s(k,m))R^2(k,m) \qquad \text{[Equation 20]}$$

Next, the second speech enhancing unit 320 may calculate a priori SNR regarding the first speech signal according to an updated decision-directed scheme, such as Equation 21 below, based on the updated $\hat{\lambda}_D(k,m)$.

$$\xi(k, m) = \max\left[\alpha_s \frac{\hat{A}^2(k, m-1)}{\hat{\lambda}_D(k, m)} + (1-\alpha_s)\left[\frac{R^2(k, m)}{\hat{\lambda}_D(k, m)} - 1\right], \xi_{min}\right] \qquad \text{[Equation 21]}$$

In Equation 21, $\xi_{min}$ denotes a pre-set constant, and $\hat{A}(k,m)$ may be an estimated value of a second speech signal, which is an output signal of the second speech enhancing unit 320.

According to an embodiment, the second speech enhancing unit 320 may select a noise removing gain corresponding to the first speech signal from pre-obtained noise removing gain information based on the priori SNR and posteriori SNR regarding the first speech signal. Next, the second speech enhancing unit 320 may perform a secondary speech enhancement on the first speech signal based on the selected noise removing gain, thereby generating a second speech signal.

For example, when the priori SNR and the posteriori SNR regarding the first speech signal calculated by the second speech enhancing unit 320 are SNR_0 and SNR_1, the second speech enhancing unit 320 may select the noise removing gain G0 from the noise removing gain table 410 of FIG. 4. Next, the second speech enhancing unit 320 may perform a secondary speech enhancement for applying the noise removing gain G0 to the first speech signal, thereby generating a second speech signal.

According to an embodiment, the obtaining unit 310 may obtain a clean speech signal A and a speech signal R, which is obtained by performing a primary speech enhancement on the clean speech signal A with noise, as noise removing gain information.

Figure 5:
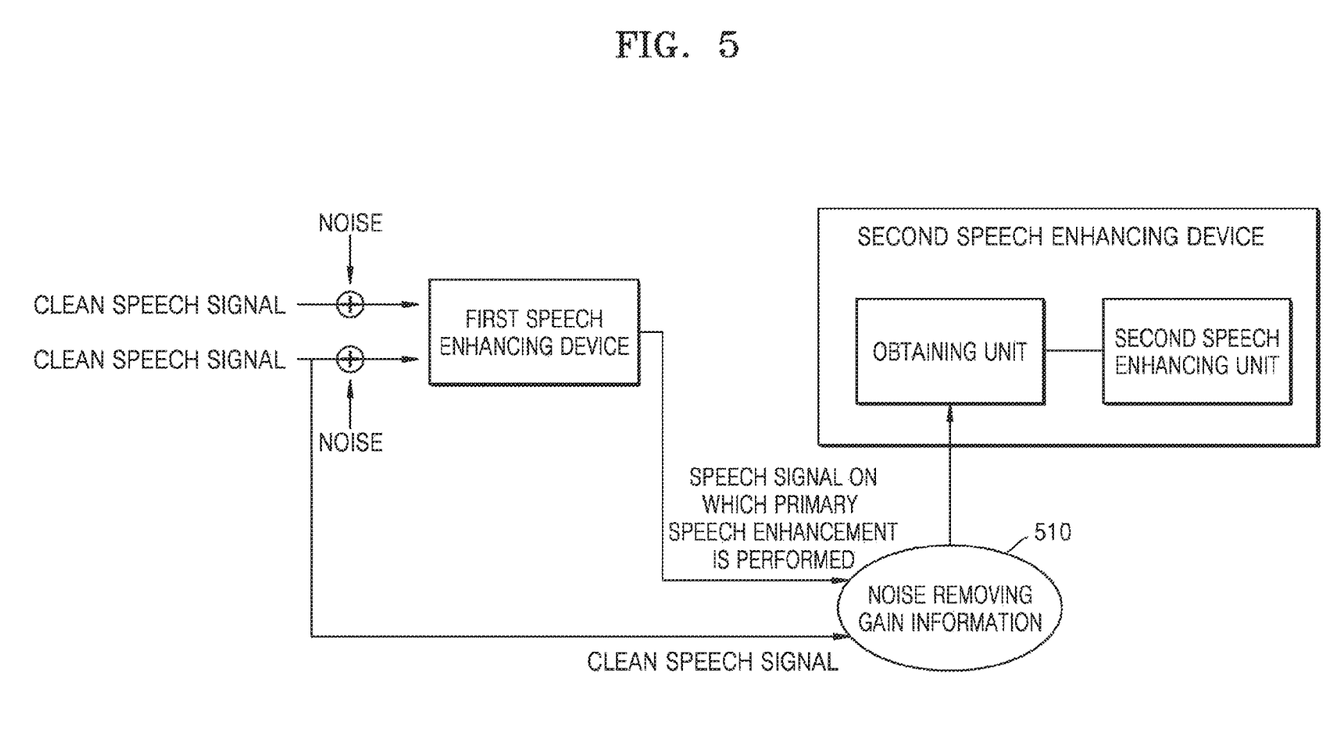
FIG. 5 is a diagram showing an embodiment in which an obtaining unit obtains noise removing gain information.

FIG. 5 is a diagram showing an embodiment in which the obtaining unit 310 obtains noise removing gain information.

The obtaining unit 310 may obtain a clean speech signal as noise removing gain information 510. Furthermore, the obtaining unit 310 may obtain a speech signal, which is obtained by performing a primary speech enhancement on the clean speech signal with noise, as noise removing gain information 520.

The second speech enhancing unit 320 of FIG. 3 may calculate a priori SNR and a posteriori SNR regarding the speech signal R. Next, the obtaining unit 310 may calculate a predetermined gain G for a speech signal A', which is obtained by applying the predetermined gain G to the speech signal R, to have a minimum mean square error with a clean speech signal A. The obtaining unit 310 may calculate a noise removing gain for minimizing noise in the speech signal R based on the priori SNRs and the posteriori SNRs of the clean speech signal A and the speech signal R according to the data-driven optimization scheme known in the art.

Figure 6:
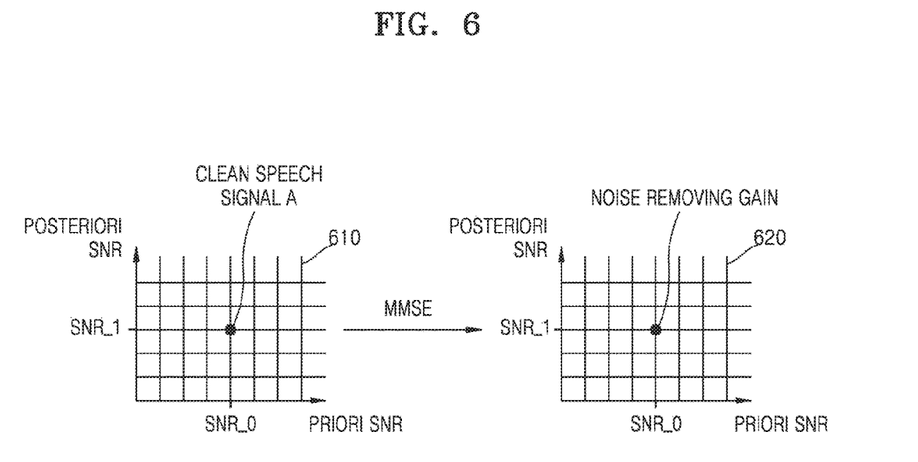
FIG. 6 is a diagram showing an embodiment in which an obtaining unit calculates a noise removing gain.

FIG. 6 is a diagram showing an embodiment in which the obtaining unit 310 calculates a noise removing gain.

The obtaining unit 310 may generate a graph 610 having a priori SNR and a posteriori SNR regarding a speech signal as coordinate axes, respectively. Amplitude values of a clean speech signal corresponding to the speech signal may be set to respective coordinates of the graph 610. For example, the amplitude value of the clean speech signal A may be stored in the priori SNR SNR_0 and posteriori SNR SNR_1 of the speech signal R of the graph 610. Next, the obtaining unit 310 may generate a graph 620 in which noise removing gains are set to respective coordinates, according to the data-driven optimization scheme known in the art, based on the graph 610. For example, the noise removing gain G0 may be set to the coordinate (SNR_0, SNR_1) of the graph 620.

Therefore, the obtaining unit 310 of FIG. 3 may calculate a noise removing gain by using the clean speech signal A and the speech signal R, which are noise removing gain information. The obtaining unit 310 may generate a noise removing gain corresponding to the priori SNR and the posteriori SNR of the speech signal R as a noise cancellation table. In other words, the obtaining unit 310 may obtain various types of clean speech signals and a speech signal on which a primary speech enhancement is performed and generate a noise removing table like the noise removing gain table 410 of FIG. 4.

Figure 7:
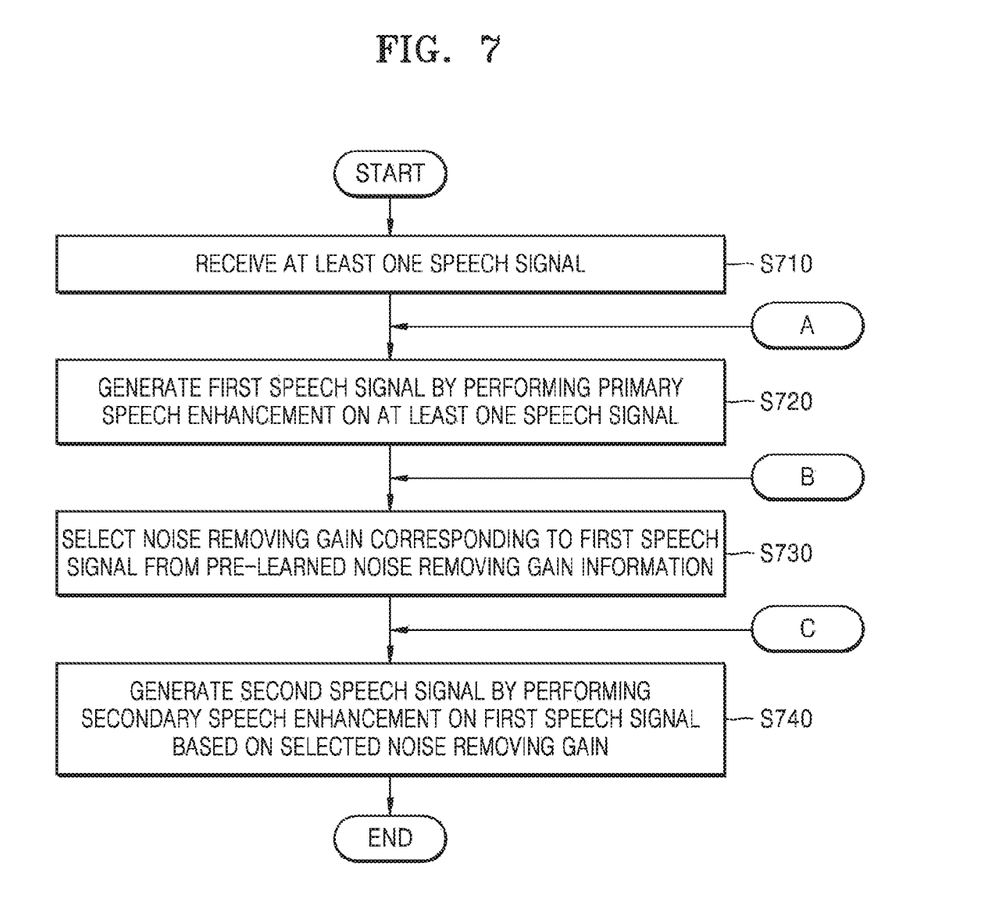
FIG. 7 is a diagram for describing a speech enhancement method performed by a speech enhancing system, according to an embodiment.

FIG. 7 is a diagram for describing a speech enhancement method performed by the speech enhancing system 10 (hereinafter, referred to as a system 10), according to an embodiment.

The method shown in FIG. 7 may be performed by the components of the system 10 of FIG. 1, and descriptions thereof given above will be omitted below.

In operation S710, the system 10 may receive at least one speech signal, according to an embodiment. The system 10 may receive at least one speech signal through at least one microphone, according to an embodiment.

In operation S720, the system 10 may generate a first speech signal by performing a primary speech enhancement on at least one speech signal, according to an embodiment. According to an embodiment, the system 10 may perform spatial filtering on at least one speech signal as the primary speech enhancement. The system 10 may perform spatial filtering on at least one speech signal based on a matrix associated with the at least one speech signal, according to an embodiment. In other words, the system 10 may perform the primary speech enhancement on at least one speech signal based on a matrix associated with the at least one speech signal, without performing a separate operation for detecting a direction. Detailed description thereof will be given below with reference to FIG. 8.

In operation S730, the system 10 may select a noise removing gain corresponding to a first speech signal from pre-learned noise removing gain information, according to an embodiment. Detailed description thereof will be given below with reference to FIG. 9.

In operation S740, the system 10 may perform a secondary speech enhancement on the first speech signal based on a selected noise removing gain, thereby generating a second speech signal. In other words, the system 10 may generate the second speech signal by performing the secondary speech enhancement for applying the selected noise removing gain to the first speech signal.

Figure 8:
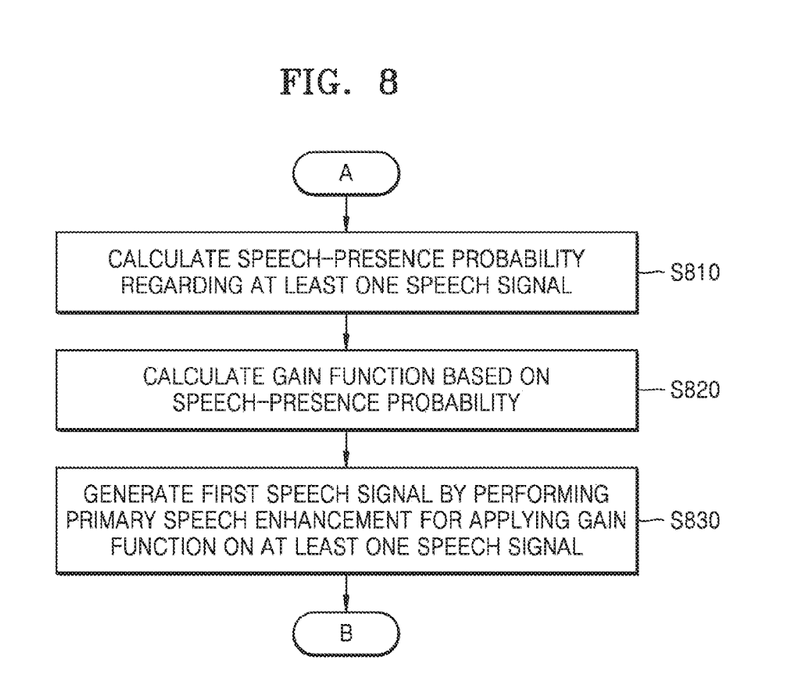
FIG. 8 is a diagram for describing operation S720 of FIG. 7 in more detail.

FIG. 8 is a diagram for describing operation S720 of FIG. 7 in more detail.

In operation S810, the system 10 may calculate a speech-presence probability regarding at least one speech signal, based on the at least one speech signal, according to an embodiment. More specifically, the system 10 may calculate a posteriori SNR regarding the at least one speech signal by using an estimated value of a power spectrum density regarding a noise signal. Next, the system 10 may calculate an estimated value of a speech-absence probability based on the calculated posteriori SNR. Furthermore, the system 10 may calculate a speech-presence probability based on the calculated estimated value of the speech-absence probability.

In operation S820, the system 10 may calculate a gain function based on the speech-presence probability, according to an embodiment. More specifically, the system 10 may calculate a smoothing variable based on the speech-presence probability. Next, the system 10 may update the estimated value of the power spectrum density regarding the noise signal by using the smoothing variable. Next, the system 10 may calculate a gain function based on the updated estimated value of the power spectrum density regarding the noise signal.

In operation S830, the system 10 may perform a primary speech enhancement for applying the calculated gain function on the at least one speech signal, thereby generating a first speech signal.

Figure 9:
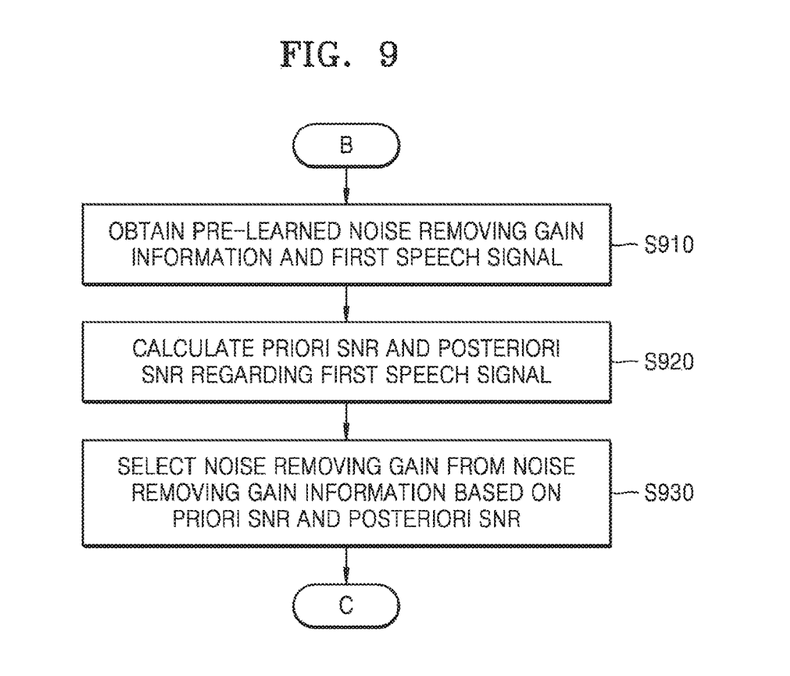
FIG. 9 is a diagram for describing operation S730 of FIG. 7 in more detail.

FIG. 9 is a diagram for describing operation S730 of FIG. 7 in more detail.

In operation S910, the system 10 may obtain pre-learned noise removing gain information, according to an embodiment. According to an embodiment, the system 10 may obtain a noise removing gain table as the pre-learned noise removing gain information. The noise removing gain table may include information regarding a priori SNR and a posteriori SNR of a speech signal on which a primary speech enhancement is performed and information regarding a noise removing gain for minimizing noise of the speech signal on which the primary speech enhancement is performed. For example, a noise removing gain table may include a noise removing gain G0 for minimizing noise of a speech signal having a priori SNR SNR_0 and a posteriori SNR SNR_1.

Furthermore, the system 10 may obtain a clean speech signal A and a speech signal R, which is obtained by performing a primary speech enhancement on the clean speech signal A with noise, as noise removing gain information. The second speech enhancing unit 320 may calculate a priori SNR and a posteriori SNR regarding the speech signal R. Next, the system 10 may calculate a predetermined gain G for a speech signal A', which is obtained by applying the predetermined gain G to the speech signal R, to have a minimum mean square error with the clean speech signal A. Furthermore, the system 10 may calculate a noise removing gain for minimizing noise in the speech signal R based on the priori SNRs and the posteriori SNRs of the clean speech signal A and the speech signal R according to the data-driven optimization scheme known in the art.

Therefore, the system 10 may calculate the noise removing gain by using the clean speech signal A and the speech signal R, which are noise removing gain information. Furthermore, the system 10 may generate a noise removing gain corresponding to the priori SNR and posteriori SNR of the speech signal R as a noise removing table. In other words, the system 10 may obtain various types of clean speech signals and a speech signal on which a primary speech enhancement is performed and generate a noise removing table.

Furthermore, the system 10 may obtain a first speech signal on which primary speech enhancement is performed.

In operation S920, the system 10 may calculate a priori SNR and a posteriori SNR regarding the first speech signal. More specifically, the system 10 may calculate the posteriori SNR regarding the first speech signal. Next, the system 10 may calculate an estimated value of a speech-presence probability based on the posteriori SNR. Next, the system 10 may calculate a smoothing variable based on the estimated value of the speech-presence probability. Next, the system 10 may update noise power based on a smoothing variable. Next, the system 10 may calculate the priori SNR regarding the first speech signal based on the updated noise power.

In operation S930, the system 10 may select a noise removing gain from the obtained noise removing gain information, based on the calculated priori SNR and the calculated posteriori SNR, according to an embodiment. For example, when the priori SNR and the posteriori SNR regarding the first speech signal calculated by the system 10 are SNR_0 and SNR_1, respectively, the system 10 may select a noise removing gain G0 from a noise removing gain table.

The device described herein may comprise a processor, a memory for storing program data and executing the program data, a permanent storage unit such as a disk drive, a communications port for handling communication with external devices, and user interface devices, including a touch panel, keys, buttons, etc. When software modules or algorithms are involved, these software modules may be stored as program instructions or computer-readable code executable on a processor on a computer-readable recording medium. Examples of the computer-readable recording medium include magnetic storage media (e.g., ROM, floppy disks, hard disks, etc.), and optical recording media (e.g., CD-ROMs, or DVDs). The computer-readable recording medium can also be distributed over network-coupled computer systems so that the computer-readable code is stored and executed in a distributed fashion. This media can be read by the computer, stored in the memory, and executed by the processor.

The present invention may be described in terms of functional block components and various processing steps. Such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, where the elements of the present invention are implemented using software programming or software elements, the invention may be implemented with any programming or scripting language such as C, C++, Java, assembler, or the like, with the various algorithms being implemented with any combination of data structures, objects, processes, routines or other programming elements. Functional aspects may be implemented in algorithms that are executed on one or more processors. Furthermore, the present invention could employ any number of conventional techniques for electronics configuration, signal processing and/or control, data processing and the like. The words "mechanism", "element", "means", and "configuration" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

The use of the terms "a", "an", "the", and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to one of ordinary skill in the art without departing from the spirit and scope of the present invention.

The invention claimed is:

1. A speech enhancement method comprising:
receiving at least one speech signal;
generating a first speech signal by performing a primary speech enhancement on the at least one speech signal;
selecting a noise removing gain corresponding to the first speech signal from pre-learned noise removing gain information; and
generating a second speech signal by performing a secondary speech enhancement on the first speech signal based on the selected noise removing gain,
wherein the selecting of the noise removing gain comprises:
obtaining an a priori signal-to-noise ratio (SNR) and an a posteriori SNR regarding the first speech signal; and
selecting the noise removing gain corresponding to the a priori SNR and the a posteriori SNR, from among a plurality of noise removing gains included in the pre-learned noise removing gain information.

2. The speech enhancement method of claim 1, wherein the generating of the first speech signal comprises:
calculating a speech-presence probability regarding the at least one speech signal based on the at least one speech signal;
calculating a gain function based on the speech-presence probability; and
generating the first speech signal by performing a primary speech enhancement for applying the gain function on the at least one speech signal.

3. The speech enhancement method of claim 2, wherein the calculating of the speech-presence probability comprises calculating the speech-presence probability based on an estimate value of a frequency-specific speech-absence probability, an estimated value of a speech-absence probability regarding an entire frequency band, and an estimated value of a speech-absence probability regarding a current frame.

4. The speech enhancement method of claim 1, wherein the primary speech enhancement is a spatial filtering based on a matrix associated with the at least one speech signal.

5. The speech enhancement method of claim 1, wherein the noise removing gain information comprises noise removing gains corresponding to the a priori SNR and the a posteriori SNR of each of speech signals on which a primary speech enhancement is performed.

6. The speech enhancement method of claim 1, wherein the noise removing gain information is information trained through machine learning.

7. A non-transitory computer-readable recording medium having recorded thereon a computer program for implementing the method of claim 1.

8. A speech enhancing system comprising:
- a first speech enhancing device, which receives at least one speech signal and generates a first speech signal by performing a primary speech enhancement on the at least one speech signal; and
- a second speech enhancing device, which selects a noise removing gain corresponding to the first speech signal from pre-learned noise removing gain information and generates a second speech signal by performing a secondary speech enhancement on the first speech signal based on the selected noise removing gain,
- wherein the second speech enhancing device, which obtains an a priori signal-to-noise ratio (SNR) and an a posteriori SNR regarding the first speech signal, selects the noise removing gain corresponding to the a priori SNR and the a posteriori SNR from among a plurality of noise removing gains included in the pre-learned noise removing gain information.

9. The speech enhancement method of claim 8, wherein the first speech enhancing device comprises:
- a speech inputter, which receives the at least one speech signal via at least one microphone; and
- a first speech enhancer, which calculates a speech-presence probability regarding the at least one speech signal based on the at least one speech signal, calculates a gain function based on the speech-presence probability, and generates the first speech signal by performing a primary speech enhancement for applying the gain function on the at least one speech signal.

10. The speech enhancing system of claim 8, wherein the primary speech enhancement is a spatial filtering based on a matrix associated with the at least one speech signal.

11. The speech enhancing system of claim 8, wherein the noise removing gain information comprises noise removing gains corresponding to the a priori SNR and the a posteriori SNR of each of speech signals on which a primary speech enhancement is performed.

12. The speech enhancing system of claim 8, wherein the noise removing gain information is information trained through machine learning.

13. The speech enhancing system of claim 8, wherein the first speech enhancing device is a terminal device, and the second speech enhancing device is a server.

* * * * *